United States Patent [19]

Macedo et al.

[11] Patent Number: 4,659,512

[45] Date of Patent: Apr. 21, 1987

[54] FIXATION OF DISSOLVED METAL SPECIES WITH A COMPLEXING AGENT

[75] Inventors: Pedro B. Macedo, 6100 Highboro Dr., Bethesda, Md. 20817; Aaron Barkatt, Silver Spring, Md.

[73] Assignees: Pedro B. Macedo, Bethesda; Theodore A. Litovitz, Annapolis, both of Md.

[21] Appl. No.: 563,840

[22] Filed: Dec. 21, 1983

[51] Int. Cl.$^4$ ............ G21F 9/12; C02F 1/42; B01J 20/00; C01G 1/00

[52] U.S. Cl. ............ 252/629; 210/681; 210/682; 210/688; 252/628; 252/631; 423/2; 423/138; 502/407; 502/416; 502/417

[58] Field of Search ...... 252/629, 628, 631; 210/681, 682, 688, 912; 423/2, 138, 139; 502/401, 405, 167, 407, 413, 416, 417

[56] References Cited

U.S. PATENT DOCUMENTS

| | | | |
|---|---|---|---|
| 2,106,744 | 2/1938 | Hood et al. | 106/33.1 |
| 2,215,936 | 9/1940 | Robertson | 273/136 |
| 2,221,709 | 11/1940 | Hood et al. | 106/36.1 |
| 2,272,342 | 2/1942 | Hyde | 49/78.1 |
| 2,326,059 | 8/1943 | Nordberg | 106/52 |
| 2,336,227 | 12/1943 | Dalton | 49/79 |
| 2,340,013 | 1/1944 | Nordberg et al. | 49/79 |
| 2,943,059 | 6/1960 | Beck et al. | 252/179 |
| 3,047,434 | 7/1962 | Bulat | 134/1 |
| 3,080,262 | 3/1963 | Newman | 134/3 |
| 3,147,225 | 9/1964 | Ryan | 252/644 |
| 3,297,580 | 1/1967 | Pitzer | 252/142 |
| 3,340,200 | 9/1967 | Noble | 252/626 |
| 4,033,764 | 7/1977 | Colegate et al. | 210/688 X |
| 4,094,809 | 6/1978 | Ross | 252/626 |
| 4,097,401 | 6/1978 | Guber et al. | 252/626 |
| 4,110,093 | 9/1978 | Macedo et al. | 65/3 R |
| 4,110,096 | 8/1978 | Macedo et al. | 65/30 R |
| 4,152,287 | 5/1979 | Bjorklund et al. | 252/626 |
| 4,167,481 | 9/1979 | Cremers et al. | 210/688 X |
| 4,222,892 | 9/1980 | Motojima et al. | 252/631 X |
| 4,224,177 | 9/1980 | Macedo et al. | 252/629 |
| 4,305,827 | 12/1981 | Sasaki | 210/688 |
| 4,333,847 | 6/1982 | Tran et al. | 252/629 |
| 4,362,659 | 12/1982 | Macedo et al. | 252/629 |
| 4,448,694 | 5/1984 | Plueddemann | 210/682 |

FOREIGN PATENT DOCUMENTS

| | | | |
|---|---|---|---|
| 831745 | 3/1960 | United Kingdom | 210/681 |
| 1336241 | 11/1973 | United Kingdom | 210/681 |
| 1355535 | 6/1974 | United Kingdom | 210/681 |

OTHER PUBLICATIONS

Iler, R., "The Chemistry of Silica" (Wiley-Interscience, New York, 1979, pp. 672–676).
Yoldas, J., Mater. Sci., 14, 1843 (1979).
Yoldas, J., Non-Cryst. Solids, 38, 81 (1980).
Mukherjee, Materials Processing in the Reduced Gravity Environment of Space, Elsevier, 1982.
McGraw-Hill Encyclopedia of Science and Technology, McGraw-Hill, Inc., New York, N.Y., 1977, vol. 14, p. 696.

*Primary Examiner*—Richard D. Lovering
*Assistant Examiner*—Virginia B. Caress
*Attorney, Agent, or Firm*—Fleit, Jacobson, Cohn & Price

[57] ABSTRACT

A process for removing metal species from solution comprising passing the liquid over a composition comprising a support such as a porous silicate glass or silica gel or charcoal having interconnected pores and containing water soluble amine complexing agents absorbed on the support capable of forming a stable complex with the metal species. The preferred amine complexing agent is triethylenetetramine. The process is especially useful for removing radioactive cobalt from liquid waste streams.

26 Claims, No Drawings

FIXATION OF DISSOLVED METAL SPECIES WITH A COMPLEXING AGENT

BACKGROUND OF THE INVENTION

This invention relates to the fixation of dissolved metal species, e.g., radioactive cationic species, with a complexing agent immobilized on a support such as a silicate glass or silica gel or charcoal matrix.

A number of radioactive isotopes are present in the cooling, operational and waste water from the daily operation of nuclear power plants and fuel rod holding tanks. While these radioactive isotopes are present in the water in very low concentrations, they are nonetheless highly radioactive and toxic to human life. Safe disposal or re-use of the contaminated water can only be conducted if a sufficient quantity of radioactive isotopes is removed to reach permissible levels.

The production of $Co^{60}$ and $Co^{58}$ through neutron activation of stainless steel is prevalent in most power reactors. These isotopes of cobalt migrate through the various waste streams in the reactor and eventually contaminate the waste waters. Accordingly, the removal of radioactive cobalt is important in the waste water treatments prior to release into the environment.

Waste water often represents a mixture of primary coolant containing such radioactive ions as $Co^{58}$ and $Co^{60}$ as well as fission fragments such as $I^{131}$, $Cs^{137}$ and $Cs^{134}$ with other streams which may have high concentrations of ions. Those reactors cooled by coastal waters will have a significant content of sea water. Typical sea water contains approximately 10.5 g/l Na, 1.35 g/l Mg, 0.40 g/l Ca, 0.38 g/l K, 19.0 g/l Cl, 2.65 g/$SO_4$ and 0.065 g/l Br.

Strong acid cation resins effectively remove ionic cobalt from aqueous media having low ionic content. However, if a significant amount of water with high concentrations of ions, e.g., sea water or "hard" ground water, enters the stream, it will exhaust the resin after a relatively small number of column volumes. Thus, in order to reduce the amount of waste (spent ion exchange media), it would be desirable to develop a selective ion exchange material that will pick up Co in the presence of Na, K, Ca, Mg, etc.

Furthermore, sea water contains large concentrations of anions such as chloride and sulfate which form complexes with Co. Most of these complexes are univalent or neutral, and therefore they are less amenable to sorption by ordinary ion exchangers than the divalent Co ion.

The removal of radioactive cations such as cobalt using a porous glass cation exchanger is disclosed in co-pending application of one of the present inventors Ser. No 370,437, filed Apr. 21, 1982, now U.S. Pat. No. 4,469,628, which is a continuing application of Ser. No. 39,595, filed May 16, 1979, now abandoned, which is a continuing application of Ser. No. 959,222, filed Nov. 9, 1978, now abandoned, each by Simmons, Simmons, Macedo and Litovitz and each entitled "Fixation By Ion Exchange of Toxic Materials In A Glass Matrix". The porous glass media disclosed in the co-pending application will effectively remove Co from streams with high concentrations of Na and K. Even though very useful in many cases where the concentrations of Na and K are high while the Ca and Mg concentrations are low, the porous glass media have limitations when either Ca or Mg or both are high in concentration.

Several patents describe the use of complexing agents in the decontamination of solid surfaces and liquid streams contaminated with radioactive isotopes in nuclear facilities. U.S Pat. No. 3,047,434 describes a solution for radioactive decontamination comprising a mixture of water, ethylenediaminetetraacetic acid, sodium sulfate, sodium hydroxide, manganese dioxide and carbon black. The patent also describes a decontamination method which comprises immersing a radioactively contaminated article in a solution comprised of water, ethylenediaminetetraacetic acid, sodium sulfate, sodium hydroxide, manganese dioxide and carbon black, and subjecting said solution to ultrasonic vibration forces sufficient to produce cavitation therein. The invention relates to the decontamination of solid articles contaminated with radioactive species exemplified by cesium 134. Other adsorbents mentioned as being of possible use as ingredients of decontamination solutions in addition to manganese oxide and carbon black are silicates such as a colloidal clay, talc, and fuller's earth, chalk; sulfides of arsenic and antimony; diatomaceous earth; and metallic oxides such as alumina, magnesia, iron oxide and titanium dioxide.

U.S. Pat. No. 3,080,262 describes a process effective for removal of radioactive contaminants from a surface which comprises contacting said surface with an aqueous solution which consists essentially of an alkali and an alkanolamine, and removing radioactive contaminants from said surface. In particular, the decontamination solution consists essentially of from about 5% to about 55% by weight of an alkali metal hydroxide (such as potassium hydroxide), from about 1% to about 45% by weight of an agent taken from the group consisting of soluble salts of the aliphatic hydroxy acids and soluble salts of the low molecular weight fatty acids (such as potassium acetate or potassium hydroxyacetate) and from about 2.5% to about 30% by weight of an alkanolamine (such as triethanolamine). Ethylenediamine derivatives such as tetrakis-N-(2-hydroxypropyl) ethylenediamine are added as minor ingredients to some of the solutions mentioned in the examples.

U.S. Pat. No. 4,222,892 describes a process for preparing oxine (8-hydroxyquinoline) adsorbed - activated charcoal which comprises contacting solid oxine with activated charcoal in the air or in water until the activated charcoal becomes impregnated with the oxine. This patent mentions a method of removing radionucleides from the cooling and leakage-water from nuclear reactors. The principle of this method comprises adding an oxine into the cooling-water of the nuclear reactor or leakage-water therefrom to form water-insoluble and stable complexes of the radionucleides contained therein and adsorbing them on activated charcoal. Many kinds of operations can be employed in the method, for example an operation using activated charcoal on which oxine is adsorbed, a batchwise operation in which activated charcoal is added after addition of oxine, or a continuous operation using an activated charcoal column. However, the operation using activated charcoal on which an oxine is impregnated is recommended. A mention is also made of a method or removing heavy metals such as mercury, copper, chromium, etc., from a water solution containing the heavy metals using an activated charcoal or silica gel on which oxine is adsorbed and carried.

Ralph K. Iler "The Chemistry of Silica" (Wiley-Interscience, New York, 1979, pp. 672–676) surveys the literature pertaining to adsorption of metal ions on silica, in most cases hydroxylated silica. In several cases it reports that metal ions complexed by organic ligands can be adsorbed on silica surfaces. These include the ethylenediamine complexes of thallium, silver, nickel, cobalt, copper and zinc. All the studies quoted in this review consist of experiments where a metal ion is reacted with a dissolved organic compound in aqueous solution, and the usually slow adsorption of the resulting complex species on a silica surface is monitored.

Thus, it is an object of this invention to make sorption media which will remove dissolved metal species such as Co atoms and/or ions from aqueous streams. Another object of this invention is to make sorption media which will remove dissolved metal species such as Co atoms and/or ions from aqueous streams in the presence of large excess amounts of Na, K, Ca, Mg and other ions and/or in the presence of large excess amounts of chloride, sulfate and other species which can form complexes with cobalt. In addition to the removal of radioactive metal species, it also is an object to remove dissolved metal species from non-radioactive streams such as cleaning and metallic plating solutions and hydrometallurgical solutions.

SUMMARY OF THE INVENTION

The present invention uses a composition in which a complexing group is immobilized by attachment to a support. As used herein, "complexing agent" or "complexing group" means an atom, molecule, ion or chemical group which, upon being bonded, attached, sorbed or physically located at or close to a solid surface or a porous structure or support can cause a significant enhancement in the tendency of a dissolved ionic or neutral species to adhere to this surface or to become attached or occluded inside the porous solid. The mechanism through which this effect is achieved may consist of the formation of a coordinate covalent complex species, an insoluble or scarcely soluble compound, or a non-dissociated or weakly dissociated covalent or ionic species.

The complexing group of the present invention is formed from a suitable water soluble amine. "Water soluble" is defined to mean that the amine has a solublity of at least 0.5 g/l, preferably at least 5 g/l, at ambient temperature and pressure in neutral water at a pH of 7 at 25° C. "Amine" is defined to mean a primary, secondary or tertiary amine. Suitable amines have a neutral or basic organic molecule and include aliphatic amines such as alkylene amines. The amine may be unsubstituted or substituted by hydroxyl, phosphoro, oxo, nitrilo or the like groups. The amine preferably contains up to 4 carbon atoms (e.g., 2 carbon atoms) between amino groups. The amine preferably contains 2 to 8 carbon atoms, 2 to 5 amine groups and a ratio of carbon atoms to amine groups (C:N) of 2:1 or less.

The support in accordance with one aspect of the invention is preferably a porous silica glass or silica gel containing silicon dioxide ($SiO_2$) as a major component, having a large surface area and having large amounts of silicon-bonded hydroxyl groups on the surfaces. The $SiO_2$ content of the porous glass or silica gel desirably is at least about 70 mol % $SiO_2$ by dry weight. The support in accordance with another aspect of the invention is preferably charcoal prepared by the destructive distillation of wood such as nut shells (e.g., coconut shells). The support is modified with complexing groups (e.g., triethylenetetramine) so that metal species such as radioactive cobalt are absorbed on the surface by being complexed by the complexing groups.

The present invention provides an improvement over prior art exchangers. With respect to organic exchangers currently in use, the invention has all the advantages associated with the use of a porous glass or charcoal material as the exchanger rather than an organic material. The glass or charcoal cation exchanger is insensitive to radiation including the short-lived isotopes it is designed to remove from contaminated waters and it can be dried thus reducing the dissemination of radioactive isotopes after use.

The present invention provides an improvement over prior art exchangers in cases in which the waste streams contain metal species such as cobalt in the presence of Na, K, Ca, Mg, etc. More particularly, the present invention provides a means of selectively sorbing metal species such as cobalt at a much higher efficiency than Na, K, Ca, Mg and other similar ions.

The present invention also provides an improvement over prior art exchangers in cases in which the waste waters are loaded with chloride or sulfate. The chloride or sulfate will form complexes with metal species such as Co causing the cation exchanger to have a limited capacity. By contrast, the present invention provides a sorbing support through which cobalt (or other selected cations) can be preferentially absorbed in the presence of large quantities of chloride and sulfate anions.

The present invention also provides an improvement over art exchangers such as 8-hydroxyquinoline. The oxine has been found by the present inventors to have a cobalt capacity comparable with that of triethylenetetramine on charcoal, but to have a lower cobalt capacity on glass. However, the oxine is essentially water insoluble. It also is highly sensitive to air oxidation and is thermally sensitive above ambient temperature. By contrast, the amines of the present invention are water soluble and not readily oxidizable. The amines also are relatively thermally stable below about 100° C. And, the amines are relatively inexpensive.

The present invention also is directed to the removal of metal species from non-radioactive streams, including streams with high ionic content. Such metal species containing streams include both waste solutions obtained in industrial processes such as metal finishing, plating etc. from which it is desired to remove and, if possible, to recover metal species as well as solutions obtained in hydrometallurgical processes involving metal species containing ores, where it is desired to carry out concentration or removal of metal species.

DESCRIPTION OF THE PREFERRED EMBODIMENTS

The process according to this invention serves to absorb metal species by forming stable complexes with an amine complexing group immobilized by attachment to a support. Triethylenetetramine (TETA) is the most preferred complexing agent, at least for cobalt ion.

The support in accordance with one aspect of the invention is preferably a porous silicate glass or silica gel. Suitable glass compositions which may be utilized generally contain silicon dioxide ($SiO_2$) as a major component, have a large surface area and have large amounts of silicon-bonded hydroxyl groups on the surface. The $SiO_2$ content of the porous glass or silica gel desirably is at least about 70 mol percent $SiO_2$, preferably at least about 82 mol percent $SiO_2$, and most preferably at least about 89 mol percent $SiO_2$ on a dry basis.

Such glasses are described in the literature, see U.S. Pat. Nos. 2,106,744; 2,215,936; 2,221,709; 2,272,342; 2,326,059; 2,336,227; 2,340,013; 4,110,093; and 4,110,096, for example. The disclosures of the last two mentioned patents are incorporated herein by reference.

The porous silicate glass compositions can also be prepared in the manner described in U.S. Pat. No. 3,147,225 by forming silicate glass frit particles, dropping them through a radiant heating zone wherein they become fluid while free falling and assume a generally spherical shape due to surface tension forces and thereafter cooling them to retain their glassy nature and spherical shape.

In general, the porous silicate glass can be made by melting an alkali metal borosilicate glass, phase-separating it into two interconnected glass phases and leaching one of the phases, i.e., the boron oxide and alkali metal oxide phase, to leave behind a porous skeleton comprised mainly of the remaining high silicate glass phase. The principal property of the porous glass is that when formed it contains a large inner surface area covered by silicon-bonded hydroxyl groups. It was found preferable to use porous glass made by phase-separation and leaching because it can be made with a high surface area per unit volume and has small pore sizes to give a high concentration of silicon-bonded hydroxyl surface groups, and because the process of leaching to form the pores leaves residues of hydrolyzed silica groups in the surface groups present. The porous silicate glass may be in the shape of a suitable geometric or non-geometric container such as a cylinder, or it may be in particulate form such as powder, beads, spheroids, etc., desirably contained in a suitable container or conforming to the shape of the container such as a column, nylon bag, cube, plate-like membrane, cylinder, sphere, etc.

The literature also adequately describes the preparation of silica gel compositions which can be employed in this invention. These materials are available, for example, as LUDOX silica gel, sold by E. I. DuPont de Nemours & Co., which contains 0.08 to 0.6 wt. percent $Na_2O$ as titrable alkali believed to be present as silicon-bonded NaO-groups.

Another class of materials which can be employed in this invention includes polymerized or partially polymerized systems prepared by means of processes associated with the sol-gel technique and consisting of single-component (in particular, high-silica) or multi-component (e.g., $Na_2O-B_2O_3-SiO_2$, $SiO_2-TiO_2$) compositions (Yoldas, J. Mater. Sci., 14, 1843 (1979); Yoldas, J. Non-cryst. solids 38, 81 (1980); Mukherjee, in Materials Processing in the Reduced Gravity Environment of Space, Elsevier, 1982).

Aluminosilicates containing cations which can undergo ion-exchange processes, such as zeolites, can also be used in this invention. A zeolite is defined as "belonging to the zeolite family of minerals and synthetic compounds characterized by an alumino-silicate tetrahedral framework, ion-exchangeable large cations, and loosely held water molecules permitting reversible dehydration. The general formula can be written $(X^{1+,2+})_y(Al^{3+})_x(Si^{4+})_{1-x}O_2 \cdot nH_2O$. X is a large cation, typically an alkali or an alkaline earth." (McGraw-Hill Encyclopedia of Science and Technology, McGraw-Hill, Inc., New York, N.Y., 1977, Vol. 14, p. 696).

The surface to weight ratio of the porous silicate glass or silica gel support is at least about 0.1 $m^2/g$ to at least several thousand $m^2/g$, e.g., 10,000 $m^2/g$, preferably at least upwards of 10 $m^2/g$. A suitable surface to weight ratio of the said support can range from about 5 to about 500 $m^2/g$.

The support in accordance with another aspect of the invention is preferably charcoal. Charcoal is a form of amorphous carbon and is obtained from the destructive distillation of wood, sugar, coal and other carbonaceous materials. The term "charcoal" is intended to include the so-called activated carbons which are produced by gas or chemical treatment to create a very large surface area. Specifically, activated carbon has a large specific area and is designed for absorption from the gas and liquid states. The specific area of activated carbon can range from about 500 to 2,000 $m^2/g$, more typically about 800 to 1500 $m^2/g$. Activated granular and powdered carbon includes a pore structure created by the steps of driving off constituents from the carbonaceous raw materials and partially oxidizing the residue. The oxidation typically is conducted by means of steam, flue gas, air or carbon dioxide. The charcoal used in accordance with the invention is preferably produced from wood such as coconut or other nut shells. Suitable charcoal is available from Fisher Scientific Company, Pittsburgh, Pa. and Barnebey-Cheney, Columbus, Ohio.

The support is then treated to immobilize the amine complexing agent. The porous support is contacted with the amine complexing agent dissolved in an aqueous medium having a molarity typically of about 0.2 to 2, and a pH typically from about 3 to 11. During the contact, the amine is absorbed on the support to anchor or bond the amine to the support.

The proportion of complexing agent absorbed on the support can be regulated by several techniques. Longer times of contact of the aqueous or other solution of the amine complexing agent with the support will increase the proportion of absorbed amine complexing groups. Also, the smaller the particle size of support, the greater the proportion of the complexing groups that will be absorbed within a given time. Any other suitable technique such as varying the concentration can be used to regulate the proportion of complexing groups absorbed on the porous support. In general, as much amine complexing agent is absorbed on the support as is possible within a practical contact time, etc.

It is believed that at least some of the amine complexing agents is joined to the charcoal support. However, in some cases, a proportion of the amine is simply deposited on or within the pores of the charcoal with little, if any, chemical bonding of the complexing atoms to the support.

The amount of amine complexing groups (e.g., TETA) immobilized on the support is generally at least about 0.01% by dry weight, preferably at least about 0.1%, and most preferably at least about 1%. Generally, the support will have at most about 50% by dry weight, preferably at most about 10% by dry weight, of amine complexing groups (e.g., TETA) immobilized thereon.

The support having the complexing groups immobilized thereon is then contacted with the waste stream containing the metal species such as cobalt. The waste stream can be any of the various waste streams identified in U.S. Pat. No. 4,333,847. This contact can take place in a packed exchange or mixed bed column or in a suitable canister. Dilute solutions having less than 1 picocurie radioactivity per milliliter as well as more concentrated solutions, e.g., those having as high as 1 microcurie or more radioactivity per milliliter, can be treated by this invention.

When using an exchange column or the like, it is preferred that the porous silicate glass or other support be finely divided to a suitable size (e.g., between about 45 to 80 U.S. Standard mesh for porous silicate glass and between about 50 and 200 mesh for charcoal) to maximize the contact of the waste stream with the particles of the silicate glass or other support. In general, the glass support is preferred because of its good flow characteristics. The waste stream is passed through the column and the metal species in solution are complexed with the complexing groups in the porous glass or other support to chemically complex the cations to the support. If desired, the glass support can be fused at high temperature to collapse the pores and entrap the metal species.

The metal species include the metals of Group IVb through IIIa, inclusive, of the Periodic Table, the actinides and the rare earth metals. These metals include cobalt, nickel, chromium, aluminum, gallium, indium, thorium, copper, gold, silver, zinc, cadmium, mercury, palladium and platinum.

It has been observed that one unit volume of glass or gel or charcoal or other support can "concentrate" the metal species contained in several thousand unit volumes of waste water on a calculated basis. The term "column volume" (CV) is often used in this context and means one volume of liquid (water) per one volume of glass or gel or charcoal or other support.

SUMMARY OF EXAMPLES

Examples 1 and 3 illustrate the uses of charcoal or activated carbon impregnated with triethylenetetramine in removing radioactive cobalt (Co-58 and Co-60) from streams. These examples show that such treated supports are effective in removing cobalt radioisotopes from actual reactor waste streams (Example 3) as well as from simulated solutions (Example 1). Example 3 shows that when the concentration of salts and foreign ions is increased, using actual saline reactor service water, the performance of such charcoal media does not deteriorate and even improves relative to the performance at lower salinity levels (Example 1). Examples 2 and 4 demonstrate that in corresponding low-salinity and, in particular, high-salinity media, the performance of conventional ion exchange resins is much inferior to that of charcoal impregnated with complexing agents.

Example 5 is based on experiments carried out with non-radioactive cobalt at higher cobalt concentrations. Example 5 shows that porous glass impregnated with ethylenediamine is effective in removing cobalt from low-salinity streams.

Example 6 shows that among polyethylenepolyamines used to pre-treat charcoal for use in removal of cobalt from aqueous solutions triethylenetetramine gives the charcoal with the highest capacity. With respect to the other compounds, 1-nitroso-2-naphthol and EDTA are not very effective. Example 7 shows that charcoal can be treated with amines in the vapor phase rather than in solution, although the resulting capacity is low. Example 8 shows that leached, washed porous glass similarly treated with amines has a higher capacity than charcoal under similar conditions in spite of the larger grain size used in the case of the glass. Triethylenetetramine is again observed to be more effective than diethylenetriamine. Example 9 shows that glass treated with triethylenetetramine is also effective in removing chromate from solutions, probably through a combination of reduction and complexation. Example 10 shows that such glass is also effective in removing mercury from solutions. Example 11 shows that a similar glass pre-treated with ethylenediamine can be used to remove gold from aqueous streams. Example 12 shows that triethylenetetramine-doped charcoal is useful in removing aluminum ions from solutions.

EXAMPLES

Example 1

A simulated waste-water composition corresponding to typical waste-water in a nuclear power station based on a pressurized-water reactor and using the sea or the ocean as its source of water. This solution was prepared by mixing together 800 ml of an aqueous 2.86 g/l boric acid solution with 200 ml of synthesized sea-water. The synthesized sea-water was prepared by dissolving 27.213 g NaCl, 8.129 g $MgCl_2.6H_2O$, 1.658 g $MgSO_4$, 1.593 g $CaSO_4.2H_2O$, 0.863 g $K_2SO_4$, 0.123 g $CaCO_3$ and 0.121 g $MgBr_2.6H_2O$ in 900 ml of water, adding 0.2 ml of 1 M NaOH to bring the pH value to (8.0±0.2), and adding de-ionized water to a total volume of 1 l. The mixture was doped with Co-60 (obtained from New England Nuclear Co. in the chloride form) at an activity level of 600 nCi/l.

A quantity of 10 ml of Activated Carbon or Activated Coconut Charcoal (Fisher Scientific Co., Pittsburgh, Pa., #5-690A) (−200+500 mesh) was permitted to stand for 1 day in contact with a volume of 40 ml of an aqueous 2M triethylenetetramine (Fisher Scientific Co., Pittsburgh, Pa., #T-410) solution, with occasional shaking. This step was repeated with another 40 ml of 2M triethylenetetramine for 1 more day. The charcoal was thereupon stirred for 30 minutes with a volume of 40 ml of an aqueous 0.7M triethylenetetramine solution neutralized with 6M nitric acid to a pH value of 8.0±0.5. This step was repeated with another 40 ml of neutralized 0.7M triethylenetetramine. The charcoal was quickly rinsed four times, each time with about 40 mL of de-ionized water, and stored in a volume of 40 ml of neutralized 0.7M triethylenetetramine.

A glass column (diameter 0.8 cm) was filled to a height of 4 cm (2 ml volume) with the triethylenetetramine-treated charcoal. The charcoal was supported using porous stainless steel frits.

A total volume of 25410 ml of the simulated waste-water composition detailed above was passed through the column at a flow rate of approximately 25 ml/hr (residence time 4.8 minutes). The effluent was sampled periodically and the activity of Co-60 in the effluent samples determined and compared with the corresponding activity level in the influent by means of a sodium iodide counter and a Canberra Series 40 multichannel analyzer. The results obtained for Co-60 are given in terms of the decontamination factor (influent-:effluent counting rate) in Table 1.

TABLE 1

| Column volumes | Decontamination factor |
|---|---|
| 4750 | 203 |
| 7050 | 212 |
| 10430 | 211 |
| 10810 | 53 |
| 11040 | 37 |
| 12420 | 22 |
| 12710 | 19 |

EXAMPLE 2

The experiment described in Example 1 was repeated using the same Co-60 doped, simulated waste-water composition, but instead of using triethylenetetramine-treated charcoal the column was loaded with a volume of 1 ml of Dowex HCR-S Nuclear Grade Hydrogen Form Strongly Acidic Cation Exchange Resin (8% cross-lined, dry mesh −20+50) available from Dow Chemical Co., Midland, Mich. The flow rate was approximately 60 ml/hr (residence time of 1 minute). The results obtained for Co-60 are shown in Table 2.

TABLE 2

| Column volumes | Decontamination factor |
| --- | --- |
| 400 | 1.9 |
| 520 | 1.3 |
| 845 | 1.6 |

EXAMPLE 3

The influent tested was prepared by mixing together 700 ml of Salem reactor waste-water and 300 ml of non-radioactive service water sampled on the same day. The major components of the waste-water included: 0.026 g/l Na, 0.0038 g/l Ca, 0.002 g/l K, 0.0014 g/l Mg, 0.0008 g/l Fe, 0.0003 g/l Li, 0.0002 g/l Cu, 0.0002 g/l Mn, 0.0001 g/l Al, 0.0001 g/l Cr, 0.0001 g/l Co, 0.0001 g/l Mo, 3.18 g/l boric acid ($H_3BO_3$) 0.050 g/l phosphate ($PO_4$), 0.021 g/l chloride (Cl), 0.004 g/l sulfate ($SO_4$), and 0.002 g/l silica ($SiO_2$). The pH was about 6.0, the total radioactivity was 80 nCi/ml and the principal gamma-emitting radioisotopes were Co-58, Co-60, Mn-54, Cs-134 and Cs-137. The major components of the service water included 2.13 g/l Na, 0.20 g/l Mg, 0.13 g/l Ca, 0.11 g/l K, 0.0025 g/l Sr, 0.0024 g/l Al, 0.0016 g/l Fe, 0.0002 g/l Mn, 0.0001 g/l Ti, 0.0001 g/l Cu, 0.0001 g/l Mo, 3.25 g/l chloride (Cl), 0.70 g/l sulfate ($SO_4$), 0.013 g/l bromide (Br), 0.012 g/l silica ($SiO_2$) and 0.007 g/l boric acid ($H_3BO_3$). The pH was about 6.3.

The mixed solution was passed through Fisher Scientific Co. #5-690A charcoal treated twice with 2M triethylenetetramine (once by stirring for 18 hours followed by 0.5 hour of standing and once by stirring for 2 hours followed by 0.5 hour of standing) followed by a single treatment with 0.7 M triethylenetetramine neutralized with 6 M $H_2SO_4$ to pH (8.0±0.5) for 2 hours and storage in the latte solution.

The column volume was 2 ml and the flow rate was 12 ml/hr (residence time 10 minutes).

The results obtained for Co-58 are shown in Table 9.

TABLE 3

| Column volumes | Decontamination factor |
| --- | --- |
| 61 | 22 |
| 73 | 13 |
| 32 | 11 |
| 100 | 7.8 |
| 210 | 6.7 |
| 228 | 6.8 |
| 446 | 6.2 |
| 561 | 6.2 |
| 681 | 7.2 |
| 806 | 6.4 |

EXAMPLE 4

The experiment described in Example 3 was repeated using the same waste-water/service water mixture, but, instead of using the triethylenetetramine-treated charcoal, the column was loaded with a volume of 5 ml of the ion exchange resin obtained from the Salem Nuclear Power Station. The flow rate was 12 ml/hr (residence time of 25 minutes). The results obtained for Co-58 are shown in Table 10.

TABLE 4

| Column volumes | Decontamination factor |
| --- | --- |
| 28 | 18 |
| 42 | 15 |
| 59 | 13 |
| 66 | 11 |
| 77 | 6.1 |
| 91 | 1.9 |
| 111 | 1.3 |

EXAMPLE 5

A borosilicate glass containing approximately 54% $SiO_2$, 35% $B_2O_3$, 6% $K_2O$ and 5% $Na_2O$ and shaped in the form of rods (length—12"; diameter—0.3") was heat-treated in Vycor tubes for 110 minutes at 550° C. The rods were subsequently ground and sieved to separate out the −25+45 mesh fraction. A volume of ground glass was leached with 3M HCl for 1 day and washed with de-ionized water to remove the HCl. A volume of 100 ml of the resulting highly porous glass powder which has undergone the process detailed above was stirred with a volume of 400 ml of an aqueous 2M ethylenediamine for 0.5 hour. The glass was thereupon stirred for 1 hour with a volume of 400 ml of an aqueous 0.7 M ethylenediamine solution neutralized with 6 M nitric acid to a pH value of 8.0±0.5. The glass powder was stored in a volume of 400 ml of neutralized 0.7 M ethylenediamine.

A volume of 50 ml of the treated glass powder was rinsed with de-ionized water and loaded into a glass tube to form a column (2.8 cm diameter, 8 cm height). A volume of 5 l (100 column volumes) of a non-radioactive feed solution containing 50 mg/l cobalt (introduced as cobalt nitrate), 475 mg/l boron (introduced as boric acid) and 115 mg/l sodium (introduced as sodium hydroxide) was passed through the column at a flow rate of 23 ml/min (residence time 2.2 minutes).

Samples taken from the influent and effluent of the column every 20 column volumes (1 liter) gave consistent results of (49.7±2.3) mg/l cobalt in the influent, less than 0.005 mg/l cobalt in the effluent, based on DC plasma spectroscopy. Accordingly, the separation factor through the passage of 100 column volumes of the feed solution is higher than 10,000.

After the passage of 5 liters of influent, the separating line between the purple cobalt-loaded layer at the top of the column and the colorless unexhausted glass at the bottom was still sharp and was located 5 cm from the top of the column. The column capacity was therefore at least 50 mg cobalt/cm or 8 mg cobalt/ml of glass.

EXAMPLE 6

Eight (8) samples of charcoal pre-treated with various complexing agents have been prepared as detailed below.

(A) A quantity of 20 ml of dry Activated Carbon Type UU (Barneby-Cheney, Columbus, Ohio) was mixed with a volume of 80 ml of an aqueous 0.5M TETA (triethylenetetramine, Fisher Scientific #T-410) solution for 18 hours. After allowing 30 minutes for settling, the solution was discarded and the charcoal mixed another volume of 0.5M TETA for 2 hours, followed by another 30 minutes for settling. The excess solution was discarded.

(B) A similar treatment was carried out with EDA (ethylenediamine, Fisher Scientific #E-479) instead of TETA.

(C) A similar treatment was carried out with DETA (diethylenetriamine, Aldrich Chemical Co., Milwaukee, Wis. #D,385-6) instead of TETA.

(D) A similar treatment was carried out with TEPA (tetraethylenepentamine, Aldrich Chemical #T1,150-9) instead of TETA.

(E) A similar treatment was carried out with PEHA (pentaethylenehexamine, Fluka Chemical Co., Hauppauge, N.Y. #76438) instead of TETA.

(F) A similar treatment was carried out with TEDA (triethylenediamine, Eastman Kodak Co., Rochester, N.Y. #P 8076) instead of TETA.

(G) A similar treatment was carried out with EDTA (ethylenediamine tetraacetic acid disodium salt, Fisher Scientific #So-S-412) instead of TETA except that a volume of 400 ml of 0.1M EDTA was used in each of the two stages of the treatment.

(H) A quantity of 2 g of 1N2N (1-nitroso-2-naphthol, Aldrich Chemical #11,469-3) was dissolved in a volume of 200 ml of pure ethyl alcohol. A quantity of 10 ml of dry Type UU activated carbon was added to a volume of 100 ml of this solution and mixed together for 5 hours. After settling, the solution was discarded and the charcoal was treated again for 5 hours with a fresh volume of 100 ml of the same solution. After 5 more hours the solution was discarded and the charcoal was rinsed with a small volume of cold de-ionized water.

Each of the treated charcoal samples (A)-(H) was used to load a column (1 cm diameter) containing 3 ml of treated charcoal. A non-radioactive saline feed solution was prepared by mixing together 400 ml of synthesized sea-water solution (see Example 1) diluted to 20% with de-ionized water, 600 ml of a solution consisting of 3.861 g/L boric acid and 0.043 g/L borax, 1 g of Turco Products, Carson, Calif. TD-4324 detergent (consisting mainly of ammonium bicarbonate and sodium hexametaphosphate), 0.1 g of Turco Products TD-4521 detergent (consisting mainly of ammonium oxalate, oxalic acid and citric acid), and 0.0081 g of $CoCl_2$ $6H_2O$ (equivalent to 0.002 g Co). In each case, the solution (pH 7.2) was passed through the column at a flow rate of (3.0±0.5) ml/min.

Samples were taken every 30 column volumes and analyzed for cobalt using DC plasma spectrometry. Approximate capacities for cobalt removal were determined by evaluating the number of column volumes at which the concentration of cobalt in the column effluent became equal to half its concentration in the feed solution (i.e., a decontamination factor of 2). The results are summarized in Table 5.

TABLE 5

| Sample | Dopant | Capacity, Column Volumes |
|--------|--------|--------------------------|
| A | TETA | 425 |
| B | EDA | 275 |
| C | DETA | 310 |
| D | TEPA | 280 |
| E | PEHA | 145 |
| F | TEDA | 115 |
| G | EDTA | 135 |
| H | 1N2N | 110 |

EXAMPLE 7

A volume of 20 ml of dry Barneby-Cheney Activated Carbon Type UU was placed on the bottom of a glass jar. Two glass vials were filled, each with 10 ml of pure triethylenetetramine (Fisher Scientific #410) and placed on the bottom of the jar. The jar was loosely covered with a lid and heated to 150° C. for 30 minutes. The lid was tightened and the jar was permitted to stand for 6 hours to room temperature. It was subsequently heated again to 150° C. for 30 minutes, permitted to stand 16 hours at room temperature and 48 hours at 50° C., and rinsed with a small volume of de-ionized water. A column experiment identical with the ones described in Example 6 was run using this charcoal sample. The capacity for Co was approximately 100 column volumes.

EXAMPLE 8

A leached, washed porous glass powder was prepared according to the procedure detailed in Example 5, except that the grain size used was −45+80 mesh. Four (4) samples of this glass treated with various complexing agents were prepared as described below.

(A) A volume of 20 ml of leached, washed glass powder was mixed for 30 minutes with 100 ml of an aqueous 20 g/L TETA (tetraethylenetriamine, Fisher Scientific #T-410) solution.

(B) A similar treatment was carried out with 20 g/L TEPA (tetraethylenepentamine, Aldrich Chemical #T1-150-9) instead of TETA.

(C) A similar treatment was carried out with 20 g/L PEHA (pentaethylenehexamine, Fluka AG #76438) instead of TETA.

(D) Another volume of the same glass powder was treated under similar conditions with DETA (diethylenetriamine, Aldrich Chemical #9,385-6).

Column experiments identical with the ones described in Example 6 were run using these four glass samples. The results are summarized in Table 6.

TABLE 6

| Sample | Dopant | Capacity, Column Volumes |
|--------|--------|--------------------------|
| A | TETA | 925 |
| B | TEPA | 815 |
| C | PEHA | 365 |
| D | DETA | 295 |

EXAMPLE 9

The experiment detailed in Example 6 was repeated using the TETA-treated charcoal described in paragraph A of Example 6 and an identical feed solution except for the absence of cobalt and the presence of 11.2 mg/L chromate (equivalent to 5 mg/L Cr) introduced as $K_2CrO_4$. All other conditions of the experiment were identical with those described in Example 6. The capacity for chromate was found to be 185 column volumes.

EXAMPLE 10

A solution consisting of 4.39 g/L boric acid, 0.066 g/L borax and 0.031 g/L NaCl (pH 6.8) was passed through two separate columns. The top part of Column A consisted of a volume of 2.5 ml of Barneby-Cheney Type UU charcoal loaded with mercury through treatment with a solution of 2.86 g/L $H_3BO_3$+0.338 g/L $HgCl_2$+0.087 g/L NaOH as described in commonly assigned Ser. No. 517,472, filed July 28, 1983, which is a continuation-in-part of Ser. No. 408,162, filed Aug. 16, 1982. The bottom part of Column A consisted of 2.5 ml of untreated Type UU charcoal. The top part of Column B was identical with the top part of Column A, but its bottom part consisted of 2.5 ml of Type UU charcoal pre-treated with triethylenetetramine according to the procedure detailed in Example 1.

The feed solution was passed through each of the columns at a flow rate of 2.5 ml/min. The effluents of the two columns were analyzed for Hg, and the results are given in Table 7.

TABLE 7

| Volume Passed mL | Hg concentration in effluent | |
|---|---|---|
| | Column A | Column B |
| 500 | 0.18 | 0.08 |
| 2000 | 0.12 | 0.17 |
| 2500 | 0.28 | 0.12 |
| 3000 | 0.39 | 0.05 |
| 3500 | 1.29 | 0.05 |
| 4000 | 2.30 | 0.05 |
| 4500 | 1.99 | 0.06 |
| 5000 | 2.85 | 0.12 |

The presence of triethylenetetramine-treated charcoal is observed to suppress the leakage of mercury from the Hg-treated chracoal.

EXAMPLE 11

A leached, washed porous glass powder was prepared according to the procedure detailed in Example 5 without the ethylenediamine treatment. A volume of 50 ml of leached, washed glass powder was mixed with a volume of 200 ml of an aqueous 2M ethylenediamine (Fisher Scientific #E-479) solution for 2 hours at 55° C., then with 200 ml of fresh 2M ethylenediamine solution for 2 days at room temperature, washed with a 1M ethylenediamine solution neutralized with dilute $HNO_3$ to pH 8 and left to stand in this solution for 10 days at room temperature. A volume of 5 ml of this glass was placed in a column (1 $cm^2$ cross-section) and washed with 300 ml of de-ionized water. A feed solution consisting of 10 mg/L Au (as gold chloride in HCl) and 920 mg/L $NaNO_3$ (pH 3.0) was passed through the column at a flow rate of 8.5 ml/min. The effluent was analyzed for gold by means of DC plasma spectrometry. The results are given in Table 8.

TABLE 8

| Column Volumes | Au,mg/L |
|---|---|
| 5 | 0.03 |
| 15 | 0.05 |
| 20 | 0.07 |
| 30 | 0.10 |
| 40 | 0.14 |
| 50 | 0.35 |
| 60 | 1.27 |
| 80 | 6.92 |
| Influent | 9.08 |

EXAMPLE 12

A solution of 11.44 g/L of boric acid, 0.040 g/L of Al (introduced as aluminum chloride) at pH 5.2 was passed through a column of 1.5 ml Activated Carbon (Fisher Scientific #05-685A) treated with triethylenetetramine as detailed in Example 1 at a flow rate of 3 ml/min. The effluent was analyzed for Al by means of DC plasma spectrometry. The capacity of the column for Al (i.e., the point at which the Al concentration in the effluent reached one-half of its value in the feed solution) was found to be 535 column volumes.

The foregoing description of our invention has been directed to particular details in accordance with the requirements of the Patent Act and for purposes of explanation and illustration. It will be apparent, however, to those skilled in this art that many modifications and changes may be made without departing from the scope and spirit of the invention. It is further apparent that persons of ordinary skill in the art will, on the basis of this disclosure, be able to practice the invention within a broad range of process conditions. It is our intention in the following claims to cover all such equivalent modifications and variations as fall within the true scope and spirit of the invention.

What is claimed is:

1. A process for removing metal species of Group IVb through Group IIIa, inclusive, of the Periodic Table from a liquid containing said metal species which comprises treating a porous support having interconnected pores, said porous support being silicate glass or silica gel having an internal surface covered by silicon-bonded hydroxyl groups, with an amine complexing agent capable of forming a stable complex with said metal species whereby the internal surface of said porous support contains said amine complexing agent, said amine complexing agent being a neutral or basic water soluble alkylene amine having 2 to 5 amine groups, said amine complexing agent being present in said porous support in an amount effective to complex the metal species and form a complex between said amine complexing agent and said metal species, and passing said liquid over said porous support in a packed column to form a complex between said amine complexing agent and said metal species.

2. The process of claim 1 wherein said liquid is a water solution.

3. The process of claim 1 wherein said metal species is cobalt.

4. The process of claim 3 wherein said cobalt is radioactive cobalt.

5. The process of claim 1 wherein said amine complexing agent has 2 to 8 carbon atoms, and a carbon atom to amine group ratio of 2:1 or less.

6. The process of claim 1 wherein said liquid also contains chloride and sulfate ions.

7. The process of claim 1 wherein said amine complexing agent is triethylenetetramine.

8. The process of claim 1 wherein the silicon dioxide content of said silicate glass or silica gel is at least about 70 mol percent.

9. The process of claim 1 wherein the silicon dioxide content of said silicate glass or silica gel is at least about 82 mol percent.

10. The process of claim 1 wherein the silicon dioxide content of said silicate glass or silica gel is at least about 89 mol percent.

11. The process of claim 1 wherein said liquid is a cleaning or metallic plating solution.

12. The process of claim 1 wherein said liquid is a hydrometallurgical solution.

13. The process of claim 1 wherein said porous support comprises a silicate glass.

14. The process of claim 1 wherein said amine complexing agent is triethylenetetramine.

15. The process of claim 1 wherein said charcoal has a specific area in the range of about 500 to 200 $m^2/g$.

16. The process of claim 1 wherein said charcoal is prepared by the destructive distallation of wood.

17. The process of claim 1 wherein said metal species is cobalt.

18. The process of claim 1 wherein said amine complexing agent is triethylenetetramine, ethylenediamine, diethylenetriamine, tetraethylenepentamine or triethylenediamine.

19. The process of claim 1 wherein said metal species is a radioactive species.

20. A process for removing metal species of Group IVb through Group IIIa, inclusive, of the Periodic Table from a liquid containing said metal species which comprises passing said liquid over a composition in a packed column comprising a porous support having interconnected pores, said porous support being charcoal having an internal surface containing an amine complexing agent capable of forming a stable complex with said metal species, said amine complexing agent being a neutral or basic water soluble alkylene amine having 2 to 5 amine groups, said amine complexing agent being present in an amount effective to complex the metal species and form a complex between the amine complexing agent of said composition and said metal species.

21. The process of claim 20 wherein said metal species is a radioactive species.

22. The process of claim 20 wherein said amine complexing agent is triethylenetetramine, ethylenediamine, diethylenetriamine, tetraethylenepentamine or triethylenediamine.

23. The process of claim 20 wherein said liquid is a water solution.

24. The process of claim 20 wherein said metal species is radioactive cobalt.

25. The process of claim 20 wherein said liquid is a cleaning or metallic plating solution.

26. The process of claim 20 wherein said liquid is a hydrometallurgical solution.

* * * * *

UNITED STATES PATENT AND TRADEMARK OFFICE
CERTIFICATE OF CORRECTION

PATENT NO. : 4,659,512

DATED : April 21, 1987

INVENTOR(S) : Pedro B. MACEDO et al

It is certified that error appears in the above-identified patent and that said Letters Patent is hereby corrected as shown below:

Claim 14, line 1, change "claim 1" to -- claim 20 --.

Claim 15, line 1, change "claim 1" to -- claim 20 --;
         line 2, change "200" to -- 2000 --.

Claim 16, line 1, change "claim 1" to -- claim 20 --.

Claim 17, line 1, change "claim 1" to -- claim 20 --.

Signed and Sealed this

Twenty-first Day of January, 1992

Attest:

HARRY F. MANBECK, JR.

*Attesting Officer*      *Commissioner of Patents and Trademarks*